United States Patent Office 3,221,767
Patented Dec. 7, 1965

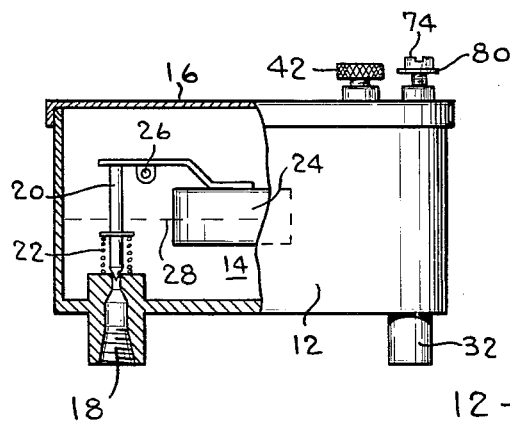
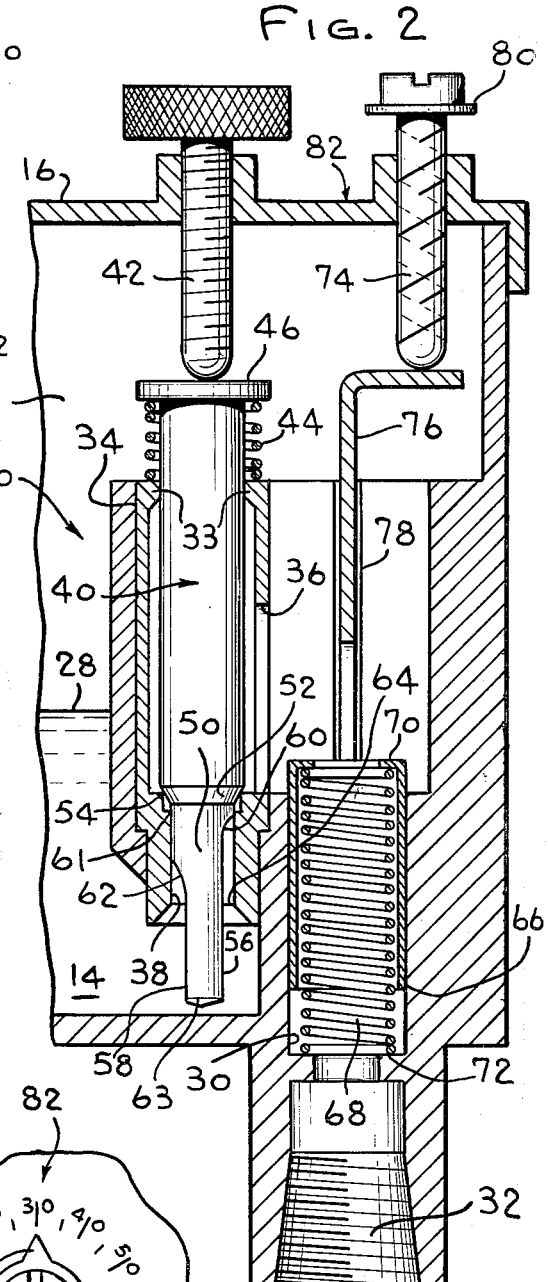
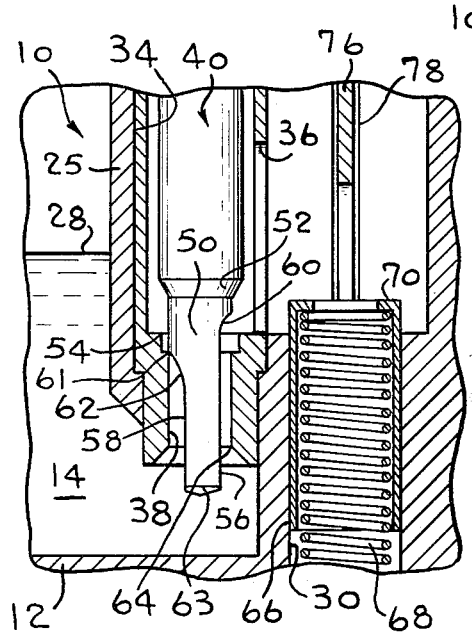
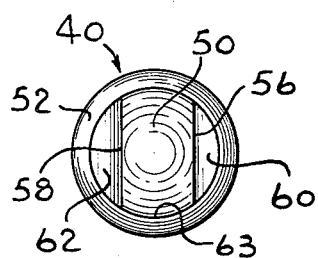
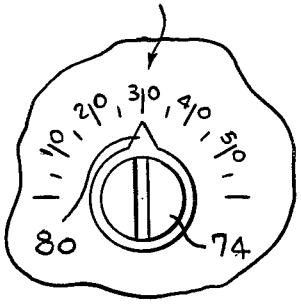
Dec. 7, 1965    L. V. McCARTY ETAL    3,221,767
METERING VALVE WITH VISCOSITY COMPENSATING ADJUSTMENT
Filed Jan. 26, 1962    2 Sheets-Sheet 1
FIG. 1
FIG. 2
FIG. 3
FIG. 4
FIG. 5
INVENTORS
LOURDES V. McCARTY
WILLIAM A. BIERMANN
ROBERT J. DUNCAN
ALLEN L. TEICHERT
BY
ATTORNEY

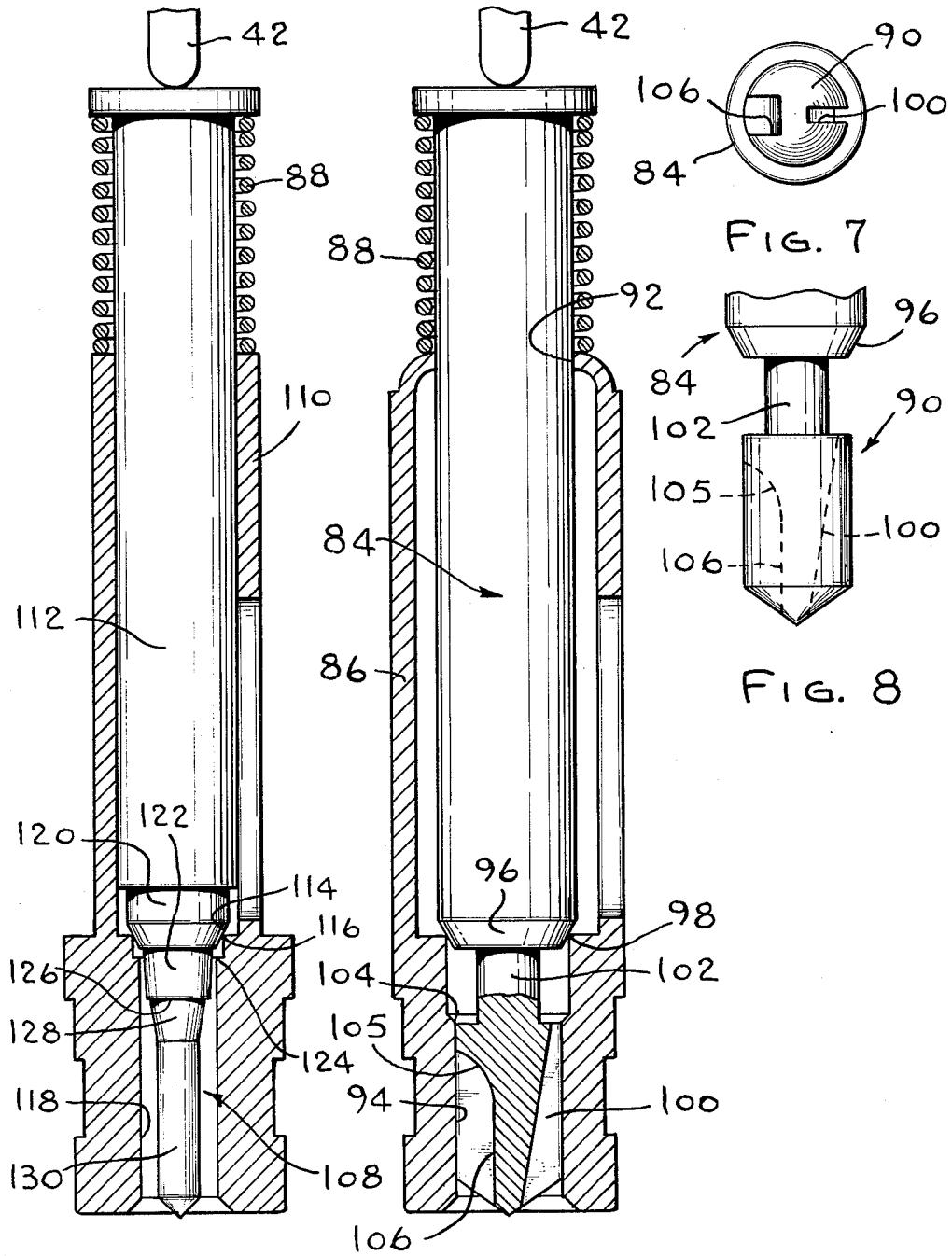

3,221,767
METERING VALVE WITH VISCOSITY
COMPENSATING ADJUSTMENT
Lourdes V. McCarty, Milwaukee, William A. Biermann, Brookfield, Robert J. Duncan, Delafield, and Allen L. Teichert, Menomonee Falls, Wis., assignors to Controls Company of America, Schiller Park, Ill., a corporation of Delaware
Filed Jan. 26, 1962, Ser. No. 168,958
2 Claims. (Cl. 137—577)

This invention relates to constant level oil control devices of the type interposed between a fuel reservoir and a burner wherein the liquid fuel flows under the regulation of a metering valve to the burner, and particularly to an improved metering valve having a flow rate characteristic which is uniformly affected by different viscosity fuels at both the low and high flow rates and which may be readily compensated to provide the same flow rate for different viscosity fuels.

Present metering systems are subject to objection in that the flow rate at low or pilot is rather critical and a build-up of manufacturing tolerances can result in a considerable deviation of the flow rate from the designed rate. A further objection is that a change in the oil viscosity from that upon which the design is based will produce a different percentage of change in flow rate at low flow and high flow. From this it follows that the present controls can not be readily compensated for different oil viscosities.

The primary object of this invention is to provide a fuel oil metering valve in which the change in flow rate due to a change in viscosity of the fuel is substantially uniform throughout the entire flow range.

Another object of this invention is to provide a fuel oil metering valve having a rather uncritical pilot or low flow setting so as to be substantially unaffected by a build-up of manufacturing tolerances.

Flow in situations here under consideration is generally affected by acceleration considerations and by viscosity which in turn is directly varied with the pressure head. In accomplishing the foregoing objects acceleration considerations are minimized so that they are of no significance. It follows, therefore, that viscosity is the controlling consideration. The present valve is designed to give, in effect, two basic flow curves (one for low flow and one for high flow) which superimpose to give the resultant flow curve of the valve. Each of the two basic flow curves (each of which can be selected by proper design) is unaffected by acceleration considerations so that viscosity is the controlling factor. The resultant flow curve is directly affected by viscosity with the change in flow rate at both low and high flow due to viscosity change being substantially the same. This characteristic by itself is a significant advance. Since the flow is viscous or laminar the rate is dependent upon pressure head and the present valve is readily compensated for viscosity change by merely adjusting the head.

Other objects and advantages will be pointed out in or be apparent from the specification and claims, as will obvious modifications of the embodiment shown in the drawing, in which:

FIG. 1 is a view of a constant level flow control device with part of the side wall broken away;

FIG. 2 is a sectional view of a metering valve in the closed position;

FIG. 3 is a sectional view of the metering valve with the pilot flow passage fully opened;

FIG. 4 is an end view of the metering valve showing the flat faces on the elongate section of the valve stem;

FIG. 5 is a fragmentary top view showing the viscosity indicia;

FIG. 6 is a view in section of a modified valve stem;

FIG. 7 is a view of the end of the modified valve stem;

FIG. 8 is a view of the metering stem portion of the valve; and

FIG. 9 is a view of a second modification of the valve stem.

Referring to the drawings, it will be seen that the improved metering valve 10 for the present invention is mounted within a casing 12 having a main liquid supply chamber 14 and a cover 16. Fuel oil is supplied to the chamber through inlet 18 and is controlled by valve 20 biased by spring 22 to follow the motion of float 24 pivoted at 26 which maintains a constant level, indicated at 28, of fuel oil in the supply chamber.

The housing 25 for the metering valve is mounted in the supply chamber and has an outlet bore 30 in communication with outlet 32 and a valve stem guide sleeve 33 in inlet bore 34. The metering valve housing projects above the oil level and is connected to the supply chamber through an upfeed metering passage 38 in the lower end of the guide sleeve and to the outlet bore through opening 36. The flow of fuel through the metering passage is controlled by a metering stem portion 50 on the lower end of valve 40 which is vertically movable in the guide sleeve. The valve is biased against the manual flow adjusting device 42 by spring 44 compressed between the top of the guide sleeve and flange 46. The flow adjusting device is schematically shown as a manually adjustable screw type control but any control can be used if desired.

The metering stem has a smaller diameter than the upper portion of the valve and is connected to the upper portion by tapered shut-off section 52 which cooperates with valve seat 54 to stop flow of fuel through the valve. The valve seat has a diameter slightly larger than the diameter of the metering passage to provide a positive contact with the shut-off section. The metering stem has a flat surface 56 cut on one side to control pilot fuel flow and a flat surface 58 cut on the other side to control high fuel flow. The diameter of the metering stem immediately below the shut-off section is very nearly the size of the metering passage so that there is virtually no flow possible past the stem until at least a portion of the arcuate cut 60 at the upper end of the pilot flat 56 is above shoulder 61. Arcuate cut 60 at the upper end of the flat surface for the pilot flow control provides a rapid increase in fuel flow for a small amount of vertical rise of the stem. When the stem has moved to the position of FIG. 3 where the entire arcuate portion has cleared shoulder 61 the remaining stem portion below cooperates with the bore to define a conduit in which laminar or viscous flow takes place. Due to the length of the flat a further stem rise will not increase flow since the passage remains the same. Arcuate cut 62 on the other side of the valve stem also provides a similar characteristic for the high flow and the cut is started at a point below the end of the arcuate cut 60 so that there will be no change in the flow rate for the small range of stem rise between the end of the arcuate cut 60 and the beginning of arcuate cut 62. The rate of pilot flow is maintained generally constant in this range so that accumulated tolerances can not move the actual valve position with respect to the shoulder out of this range thus insuring the desired flow rate for the same viscosity fuel. Any further vertical rise of the valve stem will increase the flow rate as the high fire cut 62 passes shoulder 61.

After the end of the high fire cut 62 passes the shoulder of the metering passage there would normally be no further increase in the flow rate. In some cases this would be desirable but in the present case in order to provide a continued rise in flow rate after the lower end of the cut 62 passes the shoulder the length of the metering stem from the lower end of arcuate cut 62 to the effective end 63 of the valve stem is made equal to the length of the metering passage from shoulder 61 to the effective edge 64 of the metering passage. The effective end of the stem will then pass the edge 64 of the metering passage when the lower end of the arcuate cut 62 passes the shoulder. This will reduce the length of the laminar flow path and consequently the resistance to fuel flow so that the flow rate will continue to increase in the high fire range for continued vertical rise of the valve stem. Since the flow rate is at all times dependent on viscosity considerations the percentage change with different oil viscosities will be at the same at low and high flow.

To compensate for the variations in actual flow rate in order to obtain a constant flow rate for different fuel viscosities, sleeve 66 is slidably mounted in the outlet bore. This sleeve is biased in an upward direction by spring 68 acting between flange 70 and shoulder 72. The position of the top of the sleeve with respect to the level of the fuel in the supply chamber will determine the pressure head in the metering stem. The position of the sleeve is varied by manually adjustable screw 74 in the cover which acts against slide 76 mounted in slots 78 in the housing. A pointer 80 is provided on the screw to cooperate with a fuel viscosity indicia 82 provided on the cover. If the viscosity of the fuel increases the sleeve is lowered to increase the head. If the viscosity of the fuel decreases the sleeve is raised to decrease the head to maintain the constant flow rate for that setting of the valve stem. This is a simple adjustment that can be made by the user without disturbing the valve stem setting. This is only one method of changing the "head" and other methods could be used such as changing the fuel level in the supply chamber.

In FIGS. 6, 7, and 8, a modified valve 84 is shown mounted for reciprocal motion in valve guide sleeve 86 which is interchangeable with valve guide sleeve 33 in housing 12. The valve is biased by spring 88 against manual adjusting device 42 and fuel is controlled by the position of metering stem 90 in metering passage 94. The valve is guided in the sleeve by an orifice 92 in the top of the sleeve and the cooperation of the outer surface of the metering stem and the inside surface of metering passage 94. The metering stem has a smaller diameter than the upper portion of the valve and is connected to a tapered shut off section 96 by an undercut section 102. The tapered section cooperates with valve seat 98 to close the metering passage and stop the flow of fuel through the housing. The undercut section provides a substantially unobstructed flow path for the fuel from shoulder 104 of the metering passage to the valve seat and has been found to increase the fuel flow rate considerably. The metering stem portion has a pilot flow groove 100 on one side and a high fire flow groove 106 on the opposite side. The pilot flow groove is tapered from the top of the metering stem to the lower end of the metering stem. It can be seen that as soon as the tapered shut-off section is lifted off of the valve seat the upper end of the pilot flow groove will provide an opening of a predetermined cross-sectional area opposite shoulder 104 allowing a predetermined amount of fuel to flow through the valve. As the valve stem is raised in the passage the cross-sectional area of the groove lying in the plane of shoulder 104 will increase as a function of the angle of the taper in the pilot flow groove providing a slowly rising fuel flow rate. The flow rate will increase rapidly when arcuate section 105 of the high flow groove is moved past shoulder 104. As seen in FIG. 8, the cross-sectional area of the pilot flow groove is relatively small in comparison to the high flow groove and will have little or no effect upon the flow rate when the metering stem is in the high flow position. Any further increase in the fuel flow rate will be caused by the reduction in the distance from shoulder 104 to the lower end of the metering stem portion.

In FIG. 9 another modified valve stem 108 is shown mounted for reciprocal motion in valve stem guide sleeve 110 which can be mounted in inlet bore 34 in place of guide sleeve 33. The valve stem is guided in the guide sleeve throughout the full length of the upper body portion 112 and is biased against the manual flow adjusting device as described above. A tapered shut-off section 114 cooperates with the valve seat 116 to stop the flow of fuel through metering passage 118. A reduced diameter portion 120 is provided above the tapered shut-off section to allow for the free flow of fuel above the seat.

The flow of fuel through the metering passage is controlled by an annular pilot flow section 122 that cooperates with shoulder 124 to provide an initial pilot flow rate when the tapered shut-off section is raised off of the valve seat. The pilot flow rate will increase slightly as the stem is moved upward in the guide sleeve due to a slight taper in the diameter of the pilot flow section. A rapid rise in the flow rate will occur when shoulder 126 on the valve stem passes shoulder 124 in the metering passage. An annular tapered high flow section 128 will then provide a slowly rising flow rate characteristic at the high flow position. Further increases in fuel flow rate are provided by the reduction in the distance from shoulder 124 to the lower end of annular section 130. This is a gradual increase produced by the reduction in the length of the flow path between the metering passage and the valve stem.

With these valve arrangements several advantages are readily apparent. Since the effect of viscosity change on the fuel flow rate is the same over the entire flow range, a marked improvement over other designs is achieved even without the compensation feature. Thus the change in flow rate due to a change in fuel oil viscosity is the same at both high and low flow producing improved combustion characteristics. The added ability to compensate for different viscosities renders the control usable with a wide range of oils and, hence, acceptable in many world markets. In addition to the manual compensation of viscosity, provision could be made to automatically compensate for temperature induced viscosity changes.

Although but one embodiment of the present invention has been illustrated and described, it will be apparent to those skilled in the art that various changes and modifications may be made therein without departing from the spirit of the invention or from the scope of the appended claims.

We claim:

1. A fuel oil flow control device comprising, a housing having an inlet and an outlet, means controlling flow through the inlet to maintain a constant level of fuel oil in the housing, a vertically extending upfeed metering passage having an entrance and an exit and inter-connecting the inlet and the outlet, valve means controlling the flow of fuel oil through the metering passage, said valve means including an elongated section mounted for axial movement in the passage and having a pilot flow contour, a high flow contour, and an extending portion located below said two contours and terminating at the end of the elongated section; the extended section cooperating with the passage to produce laminar flow through the passage, said pilot flow contour and high flow contour each having an arcuate surface to provide a rapid rise characteristic in the flow rate to a substantially constant flow characteristic in the flow rate, the start of the high flow contour being located relative to the pilot flow contour to provide a substantially constant flow rate characteristic during the movement of the valve means from pilot flow to the start of the high flow contour, and selectively movable adjustment means for varying the relative vertical position between the inlet and outlet of the housing to thereby permit variance in the difference in oil pressure between the points at the entrance and the exit of the oil into the passage.

2. A fuel oil control device according to claim 1 wherein the elongated section is longer than the metering passage, and wherein the end of the elongated section is adapted to be moved into the passage to increase the flow rate therethrough beyond the flow rate provided by said two flow contours.

References Cited by the Examiner

UNITED STATES PATENTS

| | | | |
|---|---|---|---|
| 1,390,897 | 9/1921 | Flory | 137—625.3 X |
| 1,806,565 | 5/1931 | Russel | 251—122 |
| 1,966,294 | 7/1934 | Goslee | 251—122 X |
| 2,209,442 | 7/1940 | Buffington | 158—36 |
| 2,317,556 | 4/1943 | Russel | 137—400 |
| 2,655,041 | 10/1953 | Jacobsson | 251—122 X |

FOREIGN PATENTS

| | | |
|---|---|---|
| 219,203 | 11/1958 | Australia. |
| 11,363 | 1908 | Denmark. |

M. CARY NELSON, *Primary Examiner.*

ISADOR WEIL, MARTIN P. SCHWADRON,
*Examiners.*